United States Patent [19]

Hattori

[11] 4,159,654
[45] Jul. 3, 1979

[54] AUTOMATIC TRANSMISSION APPARATUS

[75] Inventor: Torao Hattori, Wako, Japan

[73] Assignee: Honda Giken Kogyo Kabushiki Kaisha, Tokyo, Japan

[21] Appl. No.: 827,618

[22] Filed: Aug. 24, 1977

[30] Foreign Application Priority Date

Sep. 2, 1976 [JP] Japan .............................. 51/117036

[51] Int. Cl.² ............................................. F16H 3/08
[52] U.S. Cl. ..................................................... 74/331
[58] Field of Search ................. 74/331, 730, 701, 700, 74/688

[56] References Cited

U.S. PATENT DOCUMENTS

| | | | |
|---|---|---|---|
| 2,901,923 | 9/1959 | Waclawek | 74/688 |
| 2,939,341 | 6/1960 | Evernden | 74/688 |
| 3,164,232 | 1/1965 | General | 192/3.27 |
| 3,426,618 | 2/1969 | Hau | 74/688 |
| 3,446,094 | 5/1969 | Ohno et al. | 74/701 |
| 3,593,596 | 7/1971 | Race et al. | 74/331 |
| 3,769,857 | 11/1973 | Wheteley | 74/730 |
| 3,893,345 | 7/1975 | Sisson et al. | 74/331 |

Primary Examiner—Samuel Scott
Assistant Examiner—Wesley S. Ratliff, Jr.
Attorney, Agent, or Firm—Haseltine, Lake & Waters

[57] ABSTRACT

An automatic transmission apparatus in which a machine casing is provided on one side thereof with an input shaft connected to an internal combustion engine and with a torque convertor connected to the input shaft and is provided at the interior thereof with an output shaft in parallel with the input shaft. The input shaft and the output shaft are interconnected through a high-speed transmission system having a high-speed clutch and a low-speed transmission system having a low-speed clutch. The input shaft is elongated to within the machine casing so as to form a first driving shaft of direct coupled type integrally connected to the input shaft and is provided at its elongated end portion with the high-speed clutch. A tubular form of second driving shaft is connected to the output side of the torque convertor and extends along the first driving shaft and is substantially concentric therewith. The low-speed clutch is interposed between an input side portion and an output side portion of the tubular shaft.

4 Claims, 2 Drawing Figures

AUTOMATIC TRANSMISSION APPARATUS

FIELD OF INVENTION

This invention relates to automatic transmission apparatus chiefly for use in vehicles such as a motorcar or the like.

BACKGROUND OF INVENTION

Automatic transmission apparatus has been hitherto known. In one such type of apparatus, a machine casing is provided on one side with an input shaft connected to an internal combustion engine and with a torque convertor connected to the input shaft. The apparatus is further provided in the interior thereof with an output shaft in parallel with the input shaft. The input shaft and the output shaft are interconnected through a high-speed transmission system having a high-speed clutch and a low-speed transmission system having a low-speed clutch.

In this type of apparatus, however, it has been usual for the input shaft to be of the type that the same extends into the machine casing through a direct coupling clutch. Accordingly, this conventional apparatus is subject to the inconvenience that the direct coupling clutch and the torque convertor are disposed on one side of the machine casing so as to be adjacent to one another, and it cannot be avoided that this portion becomes comparatively complicated in construction.

SUMMARY OF INVENTION

This invention has for its object to provide an apparatus free from such an inconvenience as above.

To achieve the above and other of the objects of the invention, there is provided in accordance with the invention an automatic transmission comprising a casing, an input shaft outside of said casing, a first driving shaft inside of the casing and constituting an elongation of said input shaft and directly coupled thereto, an output shaft within the casing and parallel to said input shaft, a second driving shaft including first and second portions encircling said first driving shaft, a torque convertor coupling said input shaft to the first portion of said second driving shaft, a low-speed clutch coupled between said first and second portions whereby said second portion can be selectively driven by the input shaft through said torque convertor, a high-speed clutch and a high-speed transmission cooperatively and selectively coupling said first driving shaft to said output shaft for the selective driving of the latter, and gear means coupling the second portion of the second driving shaft to said output shaft.

According to a further aspect of the invention, the aforesaid gear means may include alternately operable gears and means for selectively coupling one of the gears to said output shaft for driving the latter in reverse or forward direction.

According to another feature of the invention a further shaft may be provided in parallel to said output shaft. A gear may be provided on the output shaft and gear may also be provided on said further shaft. Further, a clutch may be provided to engage the latter two said gears for the selective driving of said further shaft.

According to yet another aspect of the invention a first further gear may be provided on said first driving shaft and coupled to said low-speed clutch. Additionally, a second further gear may be provided on said further shaft to be driven thereby. In addition, there may be provided a third further gear loosely on said output shaft for coupling said first and second further gears.

The above and other objects, features and advantages of the invention will be found in the detailed description which follows hereinafter.

DETAILED DESCRIPTION

Figure 1:
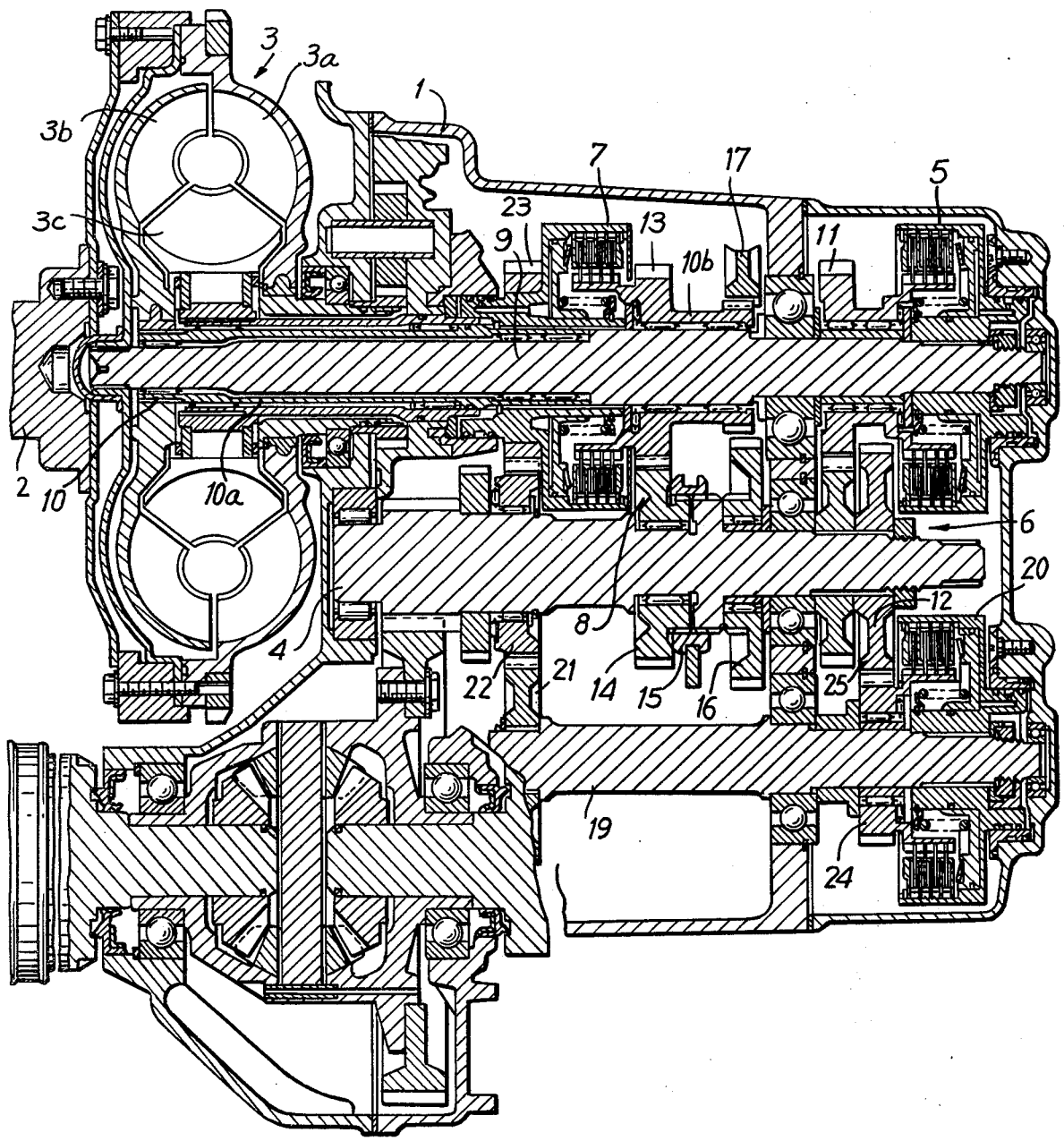
FIG. 1 is a sectional side view of an apparatus provided in accordance one embodiment of this invention.
Figure 2:
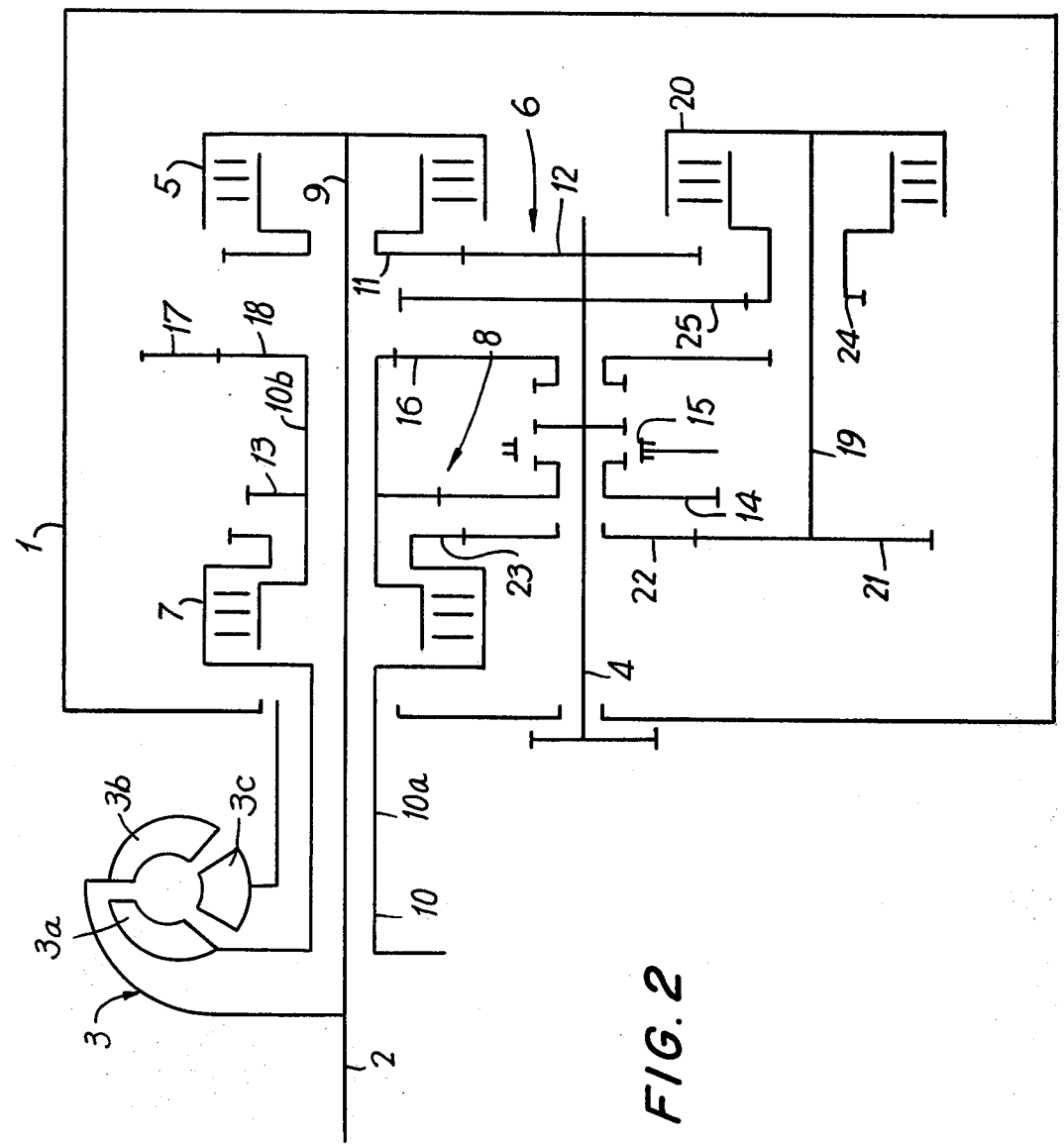
FIG. 2 is a diagrammatical sectional view of the same apparatus.

According to this invention, an automatic transmission apparatus is provided of the type in which a machine casing 1 is provided on one side thereof with an input shaft 2 connected to an internal combustion engine (not shown) and with a torque convertor 3 connected to the input shaft 2. There is also provided, at the interior of the casing, an output shaft 4 in parallel with the input shaft 2. The input shaft 2 and the output shaft 4 are interconnected through a high-speed transmission system 6 having a high-speed clutch 5 and a low-speed transmission system 8 having a low-speed clutch 7.

The input shaft 2 is elongated and extends to within the machine casing 1 so as to form a first driving shaft 9 of the direct coupled type integrally connected to the input shaft 2 which is provided at its elongated end portion with the foregoing high-speed clutch 5. A tubular form of second driving shaft 10 is connected to the output side of the torque converter 3 and is so constructed as to extend along the driving shaft 9 and be substantially concentrically related therewith. The low-speed clutch 7 is interposed between an input side portion 10a and an output side portion 10b of the shaft 10.

The torque convertor 3 is known per se and comprises a pump member 3a on its input side, a turbine member 3b on its output side and a stator member 3c in the midst thereof. The high-speed transmission system 6 is so constructed that a gear 11, provided on the output side of the high-speed clutch 5, is in engagement with a gear 12 provided on the output shaft 4.

The low-speed transmission system 8 is so constructed that a gear 14 is in mesh with a gear 13 provided on the portion 10b connected to the output side of the low-speed clutch 7 and is loosely mounted on the output shaft 4. The gear 14 is arranged to be connectible to the shaft 4 through a selector member 15.

When a gear 16, provided loosely on the other side of the output shaft 4 is selected by the selector member 15, the gear 16 is brought into engagement with a gear 18 provided on the half portion 10b through an intermediate gear 17, so that the output shaft 4 can be given a reverse directional rotation. Accordingly the associated vehicle can be run in reverse.

In the illustrated embodiment, an additional stage of low speed is used as one of the change speed stages. More specifically, an intermediate shaft 19, which is in parallel with the output shaft 4, is provided with a clutch 20 on the end portion thereof. Further, a gear 21 is provided on the intermediate shaft 19 and is arranged to be in engagement with a gear 23, provided on the input side of the low-speed clutch 7, through a gear 22 provided loosely on the output shaft 4. Additionally, a gear 24, provided on the output side of the clutch 20, is arranged to be in mesh with a gear 25 provided on the output shaft 4.

In the illustrated embodiment, the input shaft 2 and the first driving shaft 9 are integrally connected as follows:

Namely, the input shaft 2 has at its inner end an end plate 26 secured thereto by means of bolts 27 and the first driving shaft 9 is in spline engagement 28 at its outer end with a covering plate 29 of the torque convertor 3, and the end plate 26 and the covering plate 29 are jointed together along with the pump member 3a of the torque convertor 3 by means of bolts 30.

The operation of the apparatus will next be explained as follows:

Output power of the engine (not shown) is coupled from the input shaft 2, through the first driving shaft 9 directly coupled thereto, to the input side of the high-speed clutch 5 provided on the extended end of the shaft 9. The shaft 2 is also coupled through the torque convertor 3 from the input side portion 10a of the second driving shaft 10 to the input side of the low-speed clutch 7. Thus, if the high-speed clutch 5 is operative, the output shaft 4 is driven in a directly coupled fashion through the high-speed transmission system 6 whereas, if the low-speed clutch 7 is operative, the output shaft 4 is driven through the low-speed transmission system 8 under the action of the torque convertor 3. Thus, there can be obtained any desired change speed.

According to this invention, therefore, the input shaft 2 connected to the internal combustion engine is elongated from one side of the machine casing 1 to the other side thereof to within the machine casing 1 and is provided at its elongated end portion with the high-speed clutch 5, so that there can be avoided the inconvenience mentioned before relative to the conventional apparatus of the type wherein a direct coupling clutch is provided on the input side of the input shaft. Additionally, the second driving shaft 10 connected to the input shaft 2 through the torque convertor 3 is constructed in a tubular form and is positioned on the periphery of the first driving shaft 9 coaxially therewith, so that the apparatus can be made smaller in size than is the case where such a shaft is separately provided.

What is claimed is:

1. An automatic transmission comprising a casing, an input shaft outside of said casing, a first driving shaft inside of the casing and constituting an elongation of said input shaft and directly coupled thereto, an output shaft within the casing and parallel to said input shaft, a second driving shaft including first and second portions encircling said first driving shaft, a torque convertor coupling said input shaft to the first portion of said second driving shaft, a low-speed clutch coupled between said first and second portions whereby said second portion can be selectively driven by the input shaft through said torque convertor, a high-speed clutch and a high-speed transmission cooperatively and selectively coupling said first driving shaft to said output shaft for the selective driving of the latter, and gear means coupling the second portion of the second driving shaft to said output shaft.

2. An automatic transmission as claimed in claim 1 wherein said gear means includes alternately operable gears and means for selectively coupling one of the gears to said output shaft for driving the latter in reverse or forward directions.

3. An automatic transmission as claimed in claim 2 comprising a further shaft parallel to said output shaft, a gear on said output shaft, a gear on said further shaft, and meshed with said gear and a clutch for the selective driving of said further shaft.

4. An automatic transmission as claimed in claim 3 comprising a first further gear on said first driving shaft and coupled to said low-speed clutch, a second further gear on said further shaft to be driven thereby, and a third further gear loosely on said output shaft coupling said first and second further gears.

* * * * *